United States Patent
Mancosky

(10) Patent No.: US 10,220,365 B2
(45) Date of Patent: Mar. 5, 2019

(54) METHOD AND APPARATUS FOR HYDROGENATING SUBSTANCES USING CONTROLLED MECHANICALLY INDUCED CAVITATION

(71) Applicant: Hydro Dynamics, Inc., Rome, GA (US)

(72) Inventor: Douglas G. Mancosky, White, GA (US)

(73) Assignee: Hydro Dynamics, Inc., Rome, GA (US)

( * ) Notice: Subject to any disclaimer, the term of this patent is extended or adjusted under 35 U.S.C. 154(b) by 54 days.

(21) Appl. No.: 15/087,160

(22) Filed: Mar. 31, 2016

(65) Prior Publication Data

US 2016/0288078 A1 Oct. 6, 2016

Related U.S. Application Data

(60) Provisional application No. 62/140,968, filed on Mar. 31, 2015.

(51) Int. Cl.
  *B01J 19/18* (2006.01)
  *B01J 19/00* (2006.01)
  *B01F 7/00* (2006.01)

(52) U.S. Cl.
  CPC ......... *B01J 19/008* (2013.01); *B01F 7/00816* (2013.01); *B01J 19/006* (2013.01); *B01J 19/18* (2013.01); *B01J 19/1806* (2013.01); *B01J 2219/00049* (2013.01); *B01J 2219/00768* (2013.01); *B01J 2219/00777* (2013.01)

(58) Field of Classification Search
  CPC ........ B01J 19/006; B01J 19/008; B01J 19/18; B01J 19/1806; B01J 2219/00049; B01J 2219/00768; B01J 2219/00777; C07C 5/00; C07C 5/02; C07C 29/04; C07C 29/106; C07C 209/36; C07C 45/34; C07C 67/08; C07C 45/39; C07C 51/265; C07C 211/46; C07C 211/50; C07C 31/202; C07C 31/205; C07C 31/207; C07C 31/22; C07C 31/225; C07C 35/14; C07C 47/06; C07C 49/04; C07C 49/08; C07C 63/06; C07C 69/003
  See application file for complete search history.

(56) References Cited

U.S. PATENT DOCUMENTS

| | | | |
|---|---|---|---|
| 1,758,207 | A | 5/1930 | Walker |
| 2,283,244 | A | 5/1942 | Walker |
| 3,211,850 | A | 10/1965 | Toepfer |
| 4,213,332 | A | 7/1980 | Bonomo et al. |
| 4,626,319 | A | 12/1986 | Kruger et al. |
| 4,864,872 | A | 9/1989 | Stahl |
| 5,385,298 | A | 1/1995 | Griggs |
| 5,571,975 | A | 11/1996 | Smith, Jr. et al. |
| 5,957,122 | A | 9/1999 | Griggs |
| 6,221,206 | B1 | 4/2001 | Bokström et al. |
| 6,627,784 | B2 | 9/2003 | Hudson et al. |
| 7,360,755 | B2 | 4/2008 | Hudson et al. |
| 7,507,014 | B1 | 3/2009 | League et al. |
| 9,067,859 | B2 * | 6/2015 | Hassan ............... B01F 7/00766 |
| 2004/0103783 | A1 | 6/2004 | Hudson et al. |
| 2004/0232006 | A1 | 11/2004 | Kazem |
| 2005/0042129 | A1 | 2/2005 | Kazem |
| 2005/0150618 | A1 | 7/2005 | Kazem et al. |
| 2008/0272056 | A1 | 11/2008 | Kazem |
| 2010/0140107 | A1 | 6/2010 | Sloan |
| 2013/0266703 | A1 | 10/2013 | Hassan et al. |
| 2015/0328604 | A1 | 11/2015 | Smith |

FOREIGN PATENT DOCUMENTS

| | | |
|---|---|---|
| EP | 0 610 914 A1 | 8/1994 |
| JP | 55-103491 | 8/1980 |
| JP | 60-226594 | 11/1985 |
| JP | 62-213895 | 9/1987 |
| WO | WO 2007/030452 | 3/2007 |
| WO | WO 2009/062654 | 3/2009 |

* cited by examiner

*Primary Examiner* — Sharon Pregler
(74) *Attorney, Agent, or Firm* — Womble Bond Dickinson (US) LLP

(57) ABSTRACT

A method and apparatus of inducing chemical reactions such as hydrogenation of a fluidized substance includes mixing hydrogen with the substance, passing the mixture through a cavitation zone, and inducing intense shockwaves in the cavitation zone by continuously generating high energy cavitation events within the mixture. In one embodiment, the treatment zone is the interior of a controlled cavitation reactor. Interior surfaces of the reactor may be coated with a catalyst required for the desired chemical reaction so that the catalyst need not be added directly to the mixture and need not be recovered after the reaction is complete.

5 Claims, 1 Drawing Sheet

FIG. 1
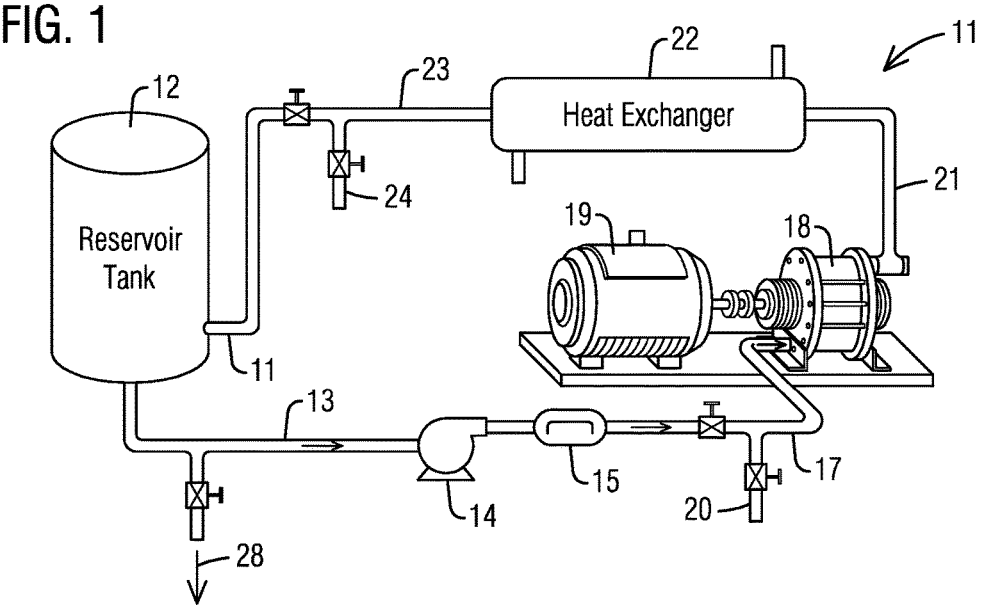
FIG. 2
| Equipment | *($k_L a$), 1/s |
|---|---|
| Mechanically Agitated Tank | 0.02 - 0.2 |
| Controller Cavitation Reactor | 0.90 - 5.2 |
*($k_L a$), 1/s; Mass Transfer Coefficient
FIG. 3
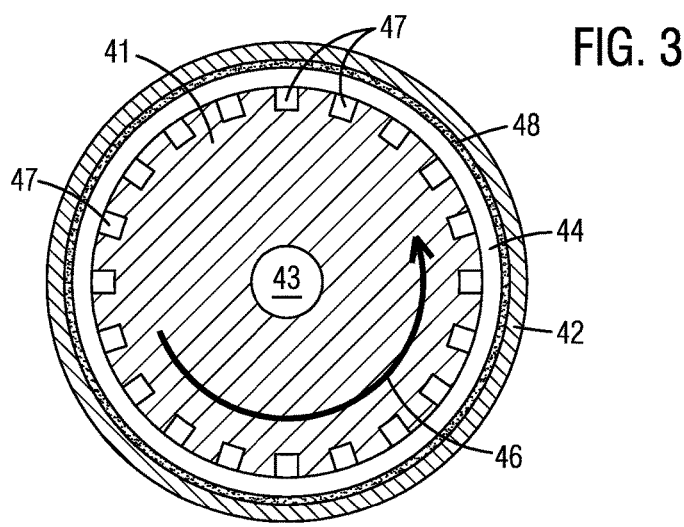

METHOD AND APPARATUS FOR HYDROGENATING SUBSTANCES USING CONTROLLED MECHANICALLY INDUCED CAVITATION

REFERENCE TO RELATED APPLICATION

Priority is hereby claimed to the filing date of U.S. provisional patent application 62/140,968 filed on Mar. 31, 2015, the contents of which are hereby incorporated by reference.

TECHNICAL FIELD

This invention relates generally to reacting hazardous and/or highly reactive gases in a small volume utilizing a high mass transfer controlled cavitation reactor to enhance reaction efficiency and safety. In one embodiment, the invention relates to hydrogenation of substances within the reactor with or without a catalyst.

BACKGROUND

Industrial chemical reactions are carried out in a wide array of manufacturing operations. Such reactions often involve or liberate highly reactive material or hazardous material that can present a significant safety risk. Examples of industrial chemical reactions that fall into this category include the production of ethylene oxide, fluorination, and hydrogenation to name a few. Hydrogenation is a chemical reaction between molecular hydrogen ($H_2$) and another compound or element, usually in the presence of a catalyst such as nickel, palladium or platinum.

The largest scale application of hydrogenation is for the processing of vegetable oils in the food industry. Typical vegetable oils are derived from polyunsaturated fatty acids (containing more than one carbon-carbon double bond). Their partial hydrogenation reduces most but not all, of these carbon-carbon double bonds. The degree of hydrogenation is controlled by restricting the amount of hydrogen, reaction temperature and time, and the catalyst. In the case of hydrogenation, hydrogen is a highly reactive molecule and can be dangerous and hazardous if not contained and controlled very carefully.

Industrial chemical reactions such as hydrogenation commonly are carried out in large reaction vessels and may involve mixing $H_2$ with a substance to be hydrogenated in the presence of a catalyst and stirring the mixture. This process can be hazardous at least in part because of the large volume of material being reacted at one time and the highly reactive nature of the $H_2$. Such reactions also often require expensive catalysts that are not always completely recoverable or are expensive to recover after the reaction is complete.

A need exists for a method and apparatus for carrying out chemical reactions such as hydrogenation involving highly reactive or hazardous material that is safe, fast, easily scalable to handle commercial volumes reactants and products, highly effective and efficient, and that does not require that a catalyst or catalysts be recovered after the reaction is complete. It is to the provision of such a method and apparatus that the present invention is primarily directed.

SUMMARY

Briefly described, a method is disclosed for conducting a chemical reaction involving dangerous or highly volatile or reactive chemicals or gasses in a manner that is far safer and far more efficient than traditional methods. For example, hydrogen can be a highly reactive, volatile, and dangerous gas when used in industrial chemical reactions such as hydrogenation. This invention includes conducting such reactions in a modified small volume, high mass transfer, controlled cavitation reactor such as the Shockwave Power Reactor available from Hydro Dynamics LLC of Rome, Ga., USA. Versions of such a reactor are disclosed in U.S. Pat. Nos. 8,465,642; 8,430,968; 7,507,014; 7,360,755; and 6,627,784, all owned by the assignee of the present application and all incorporated herein by reference. Such reactors are characterized by a cavitation zone within which reactions occur that is extremely small in volume in comparison to the volume of a standard batch reaction tank. The chemical reaction takes place in this cavitation zone, aided by intense shock waves produced by high energy cavitation events.

By conducting dangerous and/or hazardous chemical reactions such as hydrogenation within such a small volume rather than in large reaction tanks as in the past, the risk is reduced by a significant amount. Due to the mass transfer efficiency of the controlled cavitation reactor, reaction efficiency also can be improved from efficiencies of batch reaction techniques. If a catalyst or catalysts are needed to catalyze the desired chemical reactions, the catalyst can be coated on the internal surfaces of the reactor, thereby catalyzing desired reactions without the need to recover the catalysts after the reaction is complete. The relatively small controlled cavitation reactor can be attached as a side stream of an already existing batch process or incorporated as part of a continuous process. The invention will be better appreciated upon review of the detailed description set forth below when taken in conjunction with the accompanying drawing figures, which are briefly described as follows.

BRIEF DESCRIPTION OF THE DRAWINGS

FIG. 1 illustrates an embodiment of a controlled cavitation reactor for carrying out the method of the invention.

FIG. 2 is a chart that illustrates the high mass transfer ability of the controlled cavitation reactor compared to a conventional batch reaction system.

FIG. 3 is a simplified cross sectional view illustrating interior components of a controlled cavitation reactor with a catalyst coated internal surface.

DETAILED DESCRIPTION

Many chemical reactions and gas-liquid mixing process involve conditions that can be dangerous, hazardous to health, and volatile. Further, many such chemical reactions and gas-liquid mixing involve components or end products of high value so that it is critical that the process be carried out with confidence without jeopardizing the end product. Reactions and mixing under one or more of the following conditions can qualify as hazardous.
  1. Reacting or Mixing at High Temperatures
  2. Reacting or Mixing at High Pressures
  3. Reactions that Require Expensive Gasses or a High Cost Catalyst
  4. Highly Exothermic Reactions
  5. Reactions or Mixing Resulting in High Value End Product or a Product of extreme importance Hydrogenation is one example of high value reaction and is one of the most widely used industrial processes, particularly in the food industry. Hydrogenation involves the mixing of hydrogen gas ($H_2$) into substances (usually oils) at elevated temperatures and pressures. Catalysts often are added to catalyze the desired chemical reaction wherein most of the carbon-carbon double bonds of the oil molecules are reduced according to the below reaction.

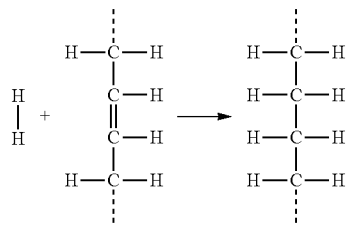

Hydrogenation is a strongly exothermic reaction. In the hydrogenation of vegetable oils and fatty acids, for example, the heat released is about 25 kcal per mole (105 kJ/mol), sufficient to raise the temperature of the oil by 1.6-1.7° C. per iodine number drop.

Hydrogenation using traditional batch reaction processes usually is hindered by poor mixing. Hydrogenation is carried out on a micro liter scale to thousands of gallons of substance per minute, depending upon the industry and application. Due at least in part to the poor mixing achieved in traditional processes, hydrogenation is normally carried out with excess hydrogen and excess catalyst, either in a packed bed or entrained as a powder, to make up for the poor mixture. The catalyst is often a high value metal such as platinum or palladium and therefore can be very expensive. It is therefore important to capture and recover as much catalyst as possible without damage it in order to maximize economics. This can be an inefficient and expensive process.

The present invention comprises a method of mixing hazardous gases like hydrogen with liquids and/or solids to achieve desired chemical reactions with safety and high efficiency. The method is carried out in a continuous process wherein a mixture of gas and liquid and/or solid is passed through the cavitation zone of a controlled cavitation reactor. Within the cavitation zone, highly energetic shock waves generated by cavitation events permeate the mixture. These shock waves, in turn, break up gas bubbles to form bubbles of extremely small size and distribute these uniformly through the mixture. This results in much more complete mixing of the gas with the liquid and greatly increased surface area contact between the molecules of gas and liquid. The ultimate result is a chemical reaction such as hydrogenation that is substantially more efficient and complete than is possible with traditional batch reaction processes.

With more complete mixing using mechanically induced cavitation in the reactor, less hydrogen can be used at lower temperatures and pressures resulting in a significant cost savings. Final product quality can also be higher due to more complete reactions and higher yields. The method of this invention also can have a safety benefit should ignition occur. This is due at least in part to an inherent much smaller mixing volume compared to traditional large stirred reaction vessels. The invention will be described within the context of hydrogenation applications wherein hydrogen gas is mixed with a substance to be hydrogenated. It will be understood, however, that the invention is not limited to this exemplary embodiment but may be used to improve the efficiency of other reactions involving hazardous or expensive materials.

FIG. 1 illustrates in simplified schematic form a controlled cavitation reactor system usable to carry out the methodology of the present invention. Such a reactor is described in detail in the incorporated references, and so will be describe only generally here. The reactor 11 comprises a reservoir tank 12 for holding a liquid or other substance to be hydrogenated. The liquid is drawn from the reservoir tank 12 through conduit 13 by a pump 14 and delivered through a flow meter 16 and conduit 17 to a controlled cavitation reactor 18. A gas inlet 20 communicates with the conduit 17 for introducing hydrogen to the liquid. The controlled cavitation reactor 18 generally comprises a cylindrical housing having an internally mounted cylindrical rotor. A space is defined between the outer peripheral surface of the rotor and the inner peripheral surface of the housing and this space is referred to as the cavitation zone. Cavitation-inducing structures such as radial bores are formed in or one the outer peripheral surface of the rotor. The rotor is rotated within the housing by an electric motor 19.

The liquid is pumped through conduit 17 toward the cavitation reactor, and hydrogen (or another appropriate gas or gas mixture) is introduced into the liquid flow through gas inlet 20. The mixture of liquid and hydrogen then flows through the cavitation zone of the controlled cavitation reactor. As the rotor is rotated at a high rate, continuous cavitation events are induced in the liquid within the radial bores of the rotor. This, in turn, produces highly energetic shock waves caused by the continuously collapsing cavitation bubbles in the bores and the shock waves propagate through the liquid-gas mixture in the cavitation zone.

The energetic shock waves induce a number of effects in the gas-liquid mixture. More specifically, the hydrogen bubbles within the mixture are broken up by the shock waves into millions of tiny bubbles of hydrogen. This, in turn, greatly increases the total surface area of hydrogen molecules contacting molecules of the liquid. Further, the tiny bubbles of hydrogen are distributed uniformly throughout the mixture as the mixture flows through the cavitation zone. The uniform distribution of tiny hydrogen bubbles ensures that concentrations of bubbles and voids without bubbles in the mixture are eliminated, thereby maximizing surface area contact between the liquid and hydrogen molecules.

After treatment in the reactor 18, the liquid-gas mixture flows through conduit 21 and may flow through a heat exchanger 22 to remove unwanted heat induced by the energy of cavitation. The cooled liquid then flows through conduit 23 and inlet 26 back to the reservoir tank 12, where any remaining hydrogen gas and other gasses migrate out of the liquid. The liquid may be circulated through the cavitation reactor as many times as desired to obtain a desired level of hydrogenation of the liquid. Then, it can be extracted as a hydrogenated end product, as indicated by arrow 28. Alternately, the system of FIG. 1 may be installed upstream of or downstream of a traditional hydrogenation in a hybrid system for hydrogenating a substance.

In a preferred embodiment, a liquid and hydrogen gas are passed through and mixed within the controlled cavitation reactor to induce hydrogenation reactions. These reactions usually require a catalyst, which as mentioned above can be an expensive material that must be recovered after the reactions are complete. One aspect of the present invention is that internal components of the cavitation reactor such as surfaces of the rotor and/or surfaces of the housing or stator are coated with the needed catalyst. Another benefit of the reactor is that a liquid or mixture within its cavitation zone is in constant motion, resulting in a very high refresh rate at internal surfaces of the reactor. In fact, it has been found that at any point on the inner housing surface, the refresh rate or the number of times a given small volume of reactants encounter a catalyst coated surface may be as high as several thousand times per second.

A desired chemical reaction, which inherently occurs at a catalyst coated surface, benefits from this very high surface refresh rate. More of the tiny and uniformly distributed gas bubbles and liquid contact the catalyst coated surface, which improves exposure to the catalyst, improves selectivity, and improves the rate of chemical hydrogenation reactions. As a result, surface area requirements are decreased as are operational costs, capital costs, and footprint requirements.

With the great surface refreshing induced in the cavitation zone, it becomes possible to coat the internal surfaces of the controlled cavitation reactor with amenable catalysts. This eliminates the need to add catalysts directly to the liquid, and thus eliminates post processing wherein the catalyst must be removed from the hydrogenated product. Cost savings with less catalyst used and/or the elimination of process steps can be substantial. Perhaps just as salient, continuous hydrogenation at commercial volumes is easily achieved with greatly reduced risks of exposure to hazardous materials and ignition with the method and apparatus of the present invention.

Through process intensification it is also possible to treat a substance continuously or have only a small volume of a batch loop where all three components (gas, liquid, and catalyst) meet and have the potential for maximum exothermic and runaway reactions. This serves to allow similar total production, but minimize the amount of fluid being treated at any one time, minimizing many of the inherent risks. A cooling jacket can be disposed around the reactor to remove excess heat generated in the hydrogenation reaction processes, thereby further enhancing safety.

If a powdered catalyst is used there is still benefit since the intense pressure fluctuations induced by cavitation can drive the fluid and gas deep inside the catalyst particles allowing for maximum catalyst surface area contact, minimum catalyst usage and enhanced reactions.

FIG. 2 is a table comparing the mass transfer efficiency of hydrogenation with a traditional mechanically agitated tank to the mass transfer efficiency of hydrogenation using the method and apparatus of the present invention. As can be seen, the mass transfer efficiency with the present invention is orders of magnitude greater than the results using traditional agitated reaction tank techniques.

FIG. 3 shows the interior components of a controlled cavitation reactor for carrying out the method of this invention. The reactor comprises a cylindrical internal rotor 41 rotatably mounted within a cylindrical housing 42. A shaft 43 is rotated by an electric motor to spin the rotor 41 at a high rate of rotation within the housing 42, as indicated by arrow 46. The peripheral surface of the rotor 41 is spaced from the interior peripheral surface of the housing 42 to define a cavitation zone 44 between the two. Cavitation inducing structures such as radial bores 47 are formed in the peripheral surface of the rotor 41. As the rotor 41 spins in the housing 42 with a fluidized substance in the cavitation zone, cavitation events are continuously created within the radial bores 47. These events induce highly energetic shock waves that propagate through the fluid within the cavitation zone 44, as described above.

For purposes of hydrogenation according to the present invention, a catalyst material 48 is coated on one or more interior surfaces of the controlled cavitation reactor. In this example, the catalyst is coated on the inner peripheral surface of the cylindrical housing. However other or additional surfaces also can be coated with the catalyst if desired. The methodology of the invention also can be carried out with powdered catalyst entrained in the fluid, but this is not the most efficient technique since the catalyst will have to be recovered from the hydrogenated substance following hydrogenation.

As discussed above, a mixture of a substance to be hydrogenated and hydrogen gas is pumped through the cavitation zone of the controlled cavitation reactor. The highly energetic shock waves induced in the mixture creates millions of tiny hydrogen bubbles and distributes them evenly throughout the mixture. The shock waves also create an extremely high refresh rate of the mixture at the surface of the catalyst coating 48. The combination of these factors in addition to high mass transfer induces hydrogenation of the substance with very high effectiveness and efficiency. Since the catalyst is coated on an interior surface of the controlled cavitation reactor, there is no need to recover catalyst from the hydrogenated substance after hydrogenation.

The invention has been described herein in terms of preferred embodiments and methodologies considered by the inventor to represent the best mode of carrying out the invention. More specifically, use of the invention for inducing hydrogenation reactions has been used as a primary example. However, the invention is not limited to hydrogenation, but is applicable to inducing any suitable chemical reaction. It will be understood by the skilled artisan that a wide gamut of additions, deletion, and modifications of the exemplary embodiments, both subtle and gross, may well be made without departing from the spirit and scope of the invention, which is delineated only by the claims.

What is claimed is:

1. A method of hydrogenating a fluidized substance comprising the steps of:
    (a) obtaining a controlled cavitation reactor having a cylindrical rotor rotatably mounted within a cylindrical housing with a cavitation zone defined between the peripheral surface of the rotor and the internal peripheral surface of the housing, the cylindrical rotor having bores formed through its peripheral surface, the controlled cavitation reactor having no structures that protrude into the cavitation zone;
    (b) generating a flow of the fluidized substance;
    (c) introducing hydrogen gas into the flow of the fluidized substance to form a mixture;
    (d) passing the mixture through the cavitation zone of the controlled cavitation reactor and rotating the rotor to induce cavitation events in the bores of the rotor thereby resulting in shock waves that propagate through the mixture within the cavitation zone, the shock waves breaking up the hydrogen gas into small bubbles and distributing the bubbles evenly throughout the mixture;
    (e) allowing the mixture to remain in the cavitation zone for a time sufficient to induce the chemical reaction between the hydrogen gas and the fluidized substance with a mass transfer coefficient between about 0.9 and about 5.2 $k_L a$, 1/s; and
    (f) recovering the substance resulting from the chemical reaction from the controlled cavitation reactor.
2. The method of claim 1 further comprising the step of exposing the mixture to a catalyst within the cavitation zone of the controlled cavitation reactor.

3. The method of claim 2 wherein the step of exposing the mixture to a catalyst comprises introducing catalyst into the flow if the mixture.

4. The method of claim 2 wherein the step of exposing the mixture to a catalyst comprises coating at least one interior surface of the controlled cavitation reactor with the catalyst.

5. The method of claim 4 wherein the step of coating at least one interior surface of the controlled cavitation reactor comprises coating the inner peripheral surface of the housing with the catalyst.

\* \* \* \* \*